(12) United States Patent
Bazer-Bachi et al.

(10) Patent No.: US 9,381,487 B2
(45) Date of Patent: Jul. 5, 2016

(54) DISTRIBUTION TRAY FOR DISTRIBUTING A POLYPHASIC MIXTURE WITH INCLINED PERIPHERAL CONDUITS

(75) Inventors: Frederic Bazer-Bachi, Irigny (FR); Frederic Augier, Saint Symphorien D Ozon (FR); Yacine Haroun, Grigny (FR); Christophe Boyer, Charly (FR)

(73) Assignee: IFP ENERGIES NOUVELLES, Rueil Malmaison (FR)

( * ) Notice: Subject to any disclaimer, the term of this patent is extended or adjusted under 35 U.S.C. 154(b) by 229 days.

(21) Appl. No.: 14/347,255

(22) PCT Filed: Sep. 10, 2012

(86) PCT No.: PCT/FR2012/000355
§ 371 (c)(1),
(2), (4) Date: Apr. 4, 2014

(87) PCT Pub. No.: WO2013/045770
PCT Pub. Date: Apr. 4, 2013

(65) Prior Publication Data
US 2014/0231309 A1     Aug. 21, 2014

(30) Foreign Application Priority Data

Sep. 30, 2011    (FR) ..................................... 11 02982

(51) Int. Cl.
| | |
|---|---|
| *B01J 8/08* | (2006.01) |
| *B01J 8/12* | (2006.01) |
| *B01J 19/00* | (2006.01) |
| *B01J 8/04* | (2006.01) |

(Continued)

(52) U.S. Cl.
CPC ............. *B01J 19/0053* (2013.01); *B01J 8/008* (2013.01); *B01J 8/0278* (2013.01); *B01J 8/0492* (2013.01); *C10G 49/002* (2013.01); *B01J 2219/00761* (2013.01); *C10G 2300/202* (2013.01)

(58) Field of Classification Search
CPC ................... B01J 19/0053; B01J 2219/00761; B01J 8/008; B01J 8/0278; B01J 8/0492; C10G 2300/202; C10G 49/002
See application file for complete search history.

(56) References Cited

U.S. PATENT DOCUMENTS

| | | | |
|---|---|---|---|
| 7,182,922 B2 | 2/2007 | Boyer et al. | |
| 7,931,871 B2 * | 4/2011 | Nascimento | ............. B01D 3/20 202/153 |

(Continued)

FOREIGN PATENT DOCUMENTS

| | | |
|---|---|---|
| EP | 2075056 A1 | 7/2009 |
| FR | 2853260 A1 | 10/2004 |

OTHER PUBLICATIONS

International Search Report from PCT/FR2012/000355 dated Dec. 5, 2012.

(Continued)

*Primary Examiner* — Renee E Robinson
*Assistant Examiner* — Derek Mueller
(74) *Attorney, Agent, or Firm* — Millen, White, Zelano, Branigan, P.C.

(57) ABSTRACT

The present invention concerns a plate for distributing a polyphase mixture in a reactor operating in trickle bed mode constituted by at least one gas phase and at least one liquid phase, the plate (10) being located above a bed of catalytic particles, comprising a plurality of chimneys (3), characterized in that a portion of the chimneys of the plate located near to the wall of the chamber of the reactor, those termed the peripheral chimneys, have an upper portion which is inclined at an angle with respect to the vertical.

The invention also concerns the use of the plate in a reactor with a view to carrying out hydrotreatment, hydrogenation or oxidation reactions.

19 Claims, 1 Drawing Sheet

(51) Int. Cl.
B01J 8/00 (2006.01)
B01J 8/02 (2006.01)
C10G 49/00 (2006.01)

(56) References Cited

U.S. PATENT DOCUMENTS 7,972,570 B2 7/2011 Vieira et al.
8,211,375 B2 7/2012 Parimi et al.
2004/0197245 A1 10/2004 Boyer et al.
2009/0155147 A1 6/2009 Vieira et al.
2011/0081282 A1 4/2011 Parimi et al.

OTHER PUBLICATIONS

French Preliminary Report and Written Opinion from PCT/FR2012/000355 dated Dec. 5, 2012.

* cited by examiner

DISTRIBUTION TRAY FOR DISTRIBUTING A POLYPHASIC MIXTURE WITH INCLINED PERIPHERAL CONDUITS

FIELD OF THE INVENTION

The present invention relates to the field of distribution of polyphase fluids in catalytic reactors. More particularly, it relates to a distributor plate that can be used to ensure the distribution of fluids in fixed bed type catalytic reactors, the fluids flowing in co-current downflow mode, more particularly in the mode known as "trickle bed" mode.

In particular, the present invention applies to the field of gas/liquid distributors used to carry out hydrocracking, hydrotreatment, hydrodesulphurization, hydrodemetallization, hydrodenitrogenation, or selective or complete hydrogenation. The present invention also applies to the field of selective hydrogenations of steam cracked gasolines, to hydrogenations of aromatic compounds in aliphatic cuts and/or naphthenic cuts, and to hydrogenations of olefins in aromatic cuts.

More generally, the present invention is applicable to any fixed bed reactor requiring a mixture of a gas phase and a liquid phase, for example in the case of reactors for carrying out a partial or complete oxidation, amination, acetyloxidation, ammoxidation or halogenation reaction, in particular a chlorination reaction.

The distributor plate of the present invention is thus in general disposed in a chamber or reactor comprising an inlet for a liquid fluid and an inlet for a gaseous fluid, and containing at least one bed of granular solids placed downstream of the distributor plate.

In the context of the present invention, the distributor plate is disposed at the head of the reactor above the bed of catalytic solid.

EXAMINATION OF THE PRIOR ART

In order to improve the distribution of gaseous and liquid fluids with such devices, one possibility employed in the prior art consists of using distributor plates comprising a plurality of mixer channels, also known as chimneys, dedicated to the passage of gas and liquid. These mixer channels may have different types and be positioned in various different configurations over the plate.

Devices of this type are described in patent applications FR 2 807 676, FR 2 745 202, FR 2 853 260 or US 2007/0241467. In general, such mixer channels are disposed perpendicular to the distributor plate, i.e. substantially vertically.

Such devices limit the height of the catalytic bed due to the height of the mixer channels and because the tops of the majority of reactors are in the shape of a semi-spherical dome. The limitation on the height of the catalytic bed reduces the catalytic activity of the reactor and, as a result, the conversion.

The height from which said semi-spherical dome commences is termed the tangent line. The plate is installed using panels of a certain size, which size is necessarily smaller than the diameter of the pipework entering the reactor.

Thus, the plate is generally mounted in the reactor by means of individually introduced panels which are then fixed together. Such panels have to be capable of being installed in the reactor. The height of the chimneys means that they cannot be placed at a height that goes significantly beyond the tangent line for reasons of bulk and problems with installation, as the semi-spherical curvature of the top of the reactor prevents them from being placed at the level of the semi-spherical dome. In fact, they are generally positioned below this tangent line.

For the same size of reactor chamber, installing a distributor plate at a lower level in the reactor means that it is thus not always possible to have the desired catalytic volume available. Or from another point of view, for a given volume of catalyst, it is necessary to use a larger reactor chamber.

The aim of the present invention is to overcome this disadvantage of the prior art by proposing a distributor plate which can be installed higher up inside the reactor, i.e. more precisely, at a smaller distance from the semi-spherical top of the reactor and possibly at a level located inside the semi-spherical dome. As a result, the distributor plate of the present invention can be used to increase the height of the catalytic bed and thus increase the chemical conversion.

BRIEF DESCRIPTION OF THE INVENTION

Figure 1:
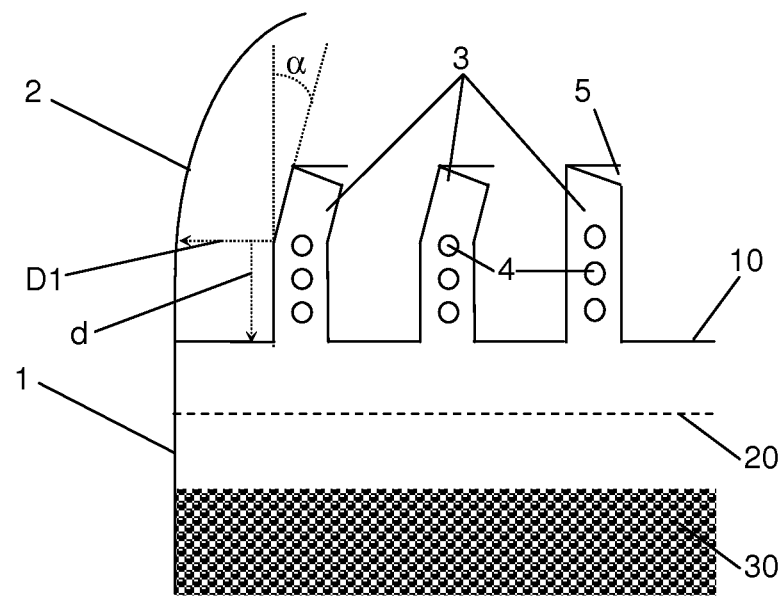
FIG. 1—Shows a distributor plate in accordance with the present invention.

The present invention describes a plate for the distribution of a polyphase mixture in a reactor functioning in trickle bed mode, i.e. with a downflowing co-current of gas and liquid phases, the liquid constituting the dispersed phase having a surface velocity of less than 1.5 cm/s, and the gas phase constituting the continuous phase.

In practice, the reactor has vertical walls 1 and ends in a semi-spherical dome 2. The plate of the present invention is defined so as to allow it to be installed higher up in the reactor, possibly until it occupies a portion of the space defined by the semi-spherical dome 2.

The distributor plate 10 of the present invention is located above a bed of solid particles 30 constituting the catalyst, and comprises a plurality of chimneys 3 characterized in that a portion of these chimneys located at the periphery, those termed peripheral chimneys, have their upper portion inclined by an angle alpha with respect to the vertical. The inclinations of all of the inclined chimneys are approximately directed towards the centre of the reactor. These chimneys will hereinafter be referred to by the abbreviation "inclined chimneys".

In a preferred embodiment of the invention, the inclined chimneys are those forming the peripheral row closest to the wall 1 or 2 of the chamber of the reactor and located at a distance from the wall 1 or 2 of the chamber of the reactor in the range 25 to 250 mm. The concept of peripheral chimneys also extends to the second row of chimneys located at a distance from the wall 1 of the reactor in the range 250 mm to 450 mm. Overall, then, the distance (D1) to the wall over which the peripheral chimneys extends is in the range 25 to 450 mm, preferably in the range 25 to 250 mm.

All of the chimneys of the distributor plate 10, central or peripheral, are separated by a pitch P in the range 100 to 250 mm, preferably in the range 100 to 200 mm.

In one embodiment of the invention, the inclined peripheral chimneys and the non-peripheral chimneys, termed the central chimneys, have a height (Hc) in the range 100 to 500 mm, preferably in the range 200 mm to 350 mm.

More precisely, the peripheral chimneys are inclined starting from a distance (d) with respect to the base of the distributor plate 10 in the range 10% to 80% of their total height, preferably in the range 50% to 80%.

The central and peripheral chimneys 3 are provided with orifices 4 provided for the passage of liquid. Clearly, for the peripheral chimneys, a portion of these orifices 4 may be located on the upper inclined portion of said chimneys.

The central and peripheral chimneys 3 also have an opening 5 at their upper end for the passage of gas.

In one embodiment of the invention, the orifices 4 for the passage of liquid are circular orifices or substantially vertical slits.

In a preferred embodiment of the invention, the plate 10 is provided with a dispersion system 20 placed below said plate 10 at a distance therefrom in the range 10 mm to 100 mm. This dispersion system is generally constituted by a screen or deflectors.

The invention also concerns a process employing a plate as described above for carrying out hydrotreatment or hydrogenation or oxidation reactions.

The invention also concerns any process employing a two-phase co-current downflow of gas and liquid phases, in which the gas phase is the continuous phase and the liquid phase is the dispersed phase, said liquid phase having a surface velocity of less than 1.5 cm/s.

DETAILED DESCRIPTION OF THE INVENTION

FIG. 1 of the present invention shows a distributor plate in accordance with the present invention constituted by two types of chimneys:

The peripheral chimneys 3, constituting the outermost row of said plate or the two outermost rows, with their upper portion inclined at an angle alpha with respect to the vertical, the angle alpha being in the range 10° to 45°, preferably in the range 10° to 30°. The inclination of the peripheral chimneys is directed approximately towards the centre of the reactor.

Preferably, the angle of inclination of the chimneys located in the row closest to the wall 1,2 of the reactor is greater than the angle of inclination of the chimneys located in the second row, a little further from the wall.

The "peripheral" chimneys are located at a distance (D1) from the wall 1 of the reactor in the range 25 mm to 450 mm, preferably in the range 25 mm to 250 mm.

More precisely, the peripheral chimneys are inclined starting from a distance (d) with respect to the base of the distributor plate in the range 10% to 80% of their total height, preferably in the range 50% to 80%.

The "central" chimneys occupy the remainder of the plate 10. They are identical to the peripheral chimneys except for the fact that they do not have any inclined portions. They have the same height and the same distribution of orifices 4 for the passage of liquid as the central chimneys.

The central and peripheral chimneys also have an opening 5 for the passage of gas located at the upper end. This opening 5 may have a variety of shapes, non-exhaustive examples of which are bevelled or a large orifice occupying the whole upper end.

The central and peripheral chimneys 3 are of length (Hc) measured from the base of the plate 10 in the range 100 to 500 mm, preferably in the range 200 to 350 mm.

The plate 10 of the invention may be used in a reactor operating in trickle bed mode, in which the gas phase corresponds to the continuous phase of the two-phase flow, and the liquid phase is in the form of trickles with a liquid surface velocity of less than 1.5 cm/s.

The plate of the invention may be provided with a dispersion system placed below the plate 10, but above the downstream catalytic bed 30 at a distance in the range 10 to 100 mm from the base of the plate 10.

Figure 2:
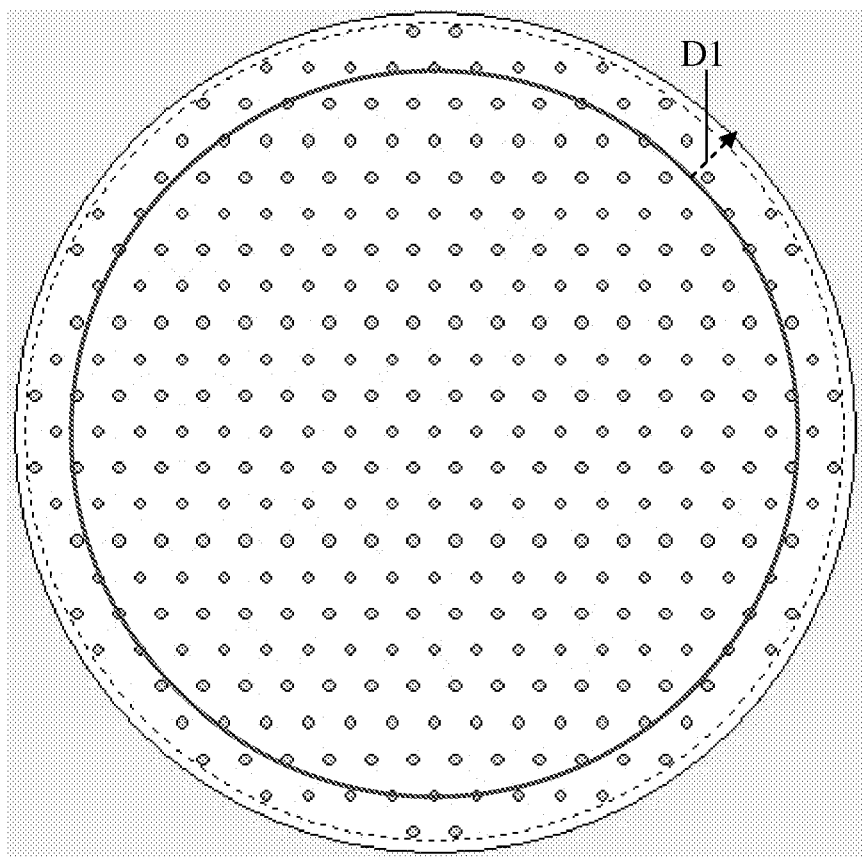
FIG. 2—A top view which shows the distance (D1).

FIG. 2 is a top view which shows the distance (D1). This distance (D1) defines the positioning of the inclined peripheral chimneys, which are located between the wall of the reactor and the circumference at distance (D1) from said wall.

The invention will now be illustrated in the following example.

EXAMPLE

In this example, two plates were compared: one in accordance with the prior art comprising chimneys all with the same size and shape, and the other in accordance with the invention, comprising inclined peripheral chimneys meaning that positioning in the reactor can be higher up.

Prior Art Plate

The distributor plate comprised chimneys with a height of 250 mm above the distributor plate and 50 mm in diameter, comprising 3 series of orifices 4 for the passage of liquid, located respectively at 50/100/150 mm in height with respect to the base of the chimneys 3, with a bevelled 50 mm opening 5 in the upper portion to allow gas to pass through.

The pitch between the chimneys was 200 mm.

The distributor plate was located 29 mm below the tangent line from which the upper semi-spherical dome of the shell commenced.

The diameter of the shell of the reactor was 5000 mm and the height of the semi-spherical shell was 2500 mm.

Plate in Accordance with the Invention

The chimneys closest to the wall 1 were inclined starting from 150 mm in height, i.e. starting from a height (d) corresponding to 60% of the total height. The angle of inclination, alpha, with respect to the vertical was 15°. The inclinations of all of the peripheral chimneys were substantially orientated towards the centre of the reactor.

The distributor plate 10 could thus be raised by a height of 100 mm (250-150). Thus, the distributor plate was now located 71 mm above the tangent line. This gain in height was used to increase the depth of catalyst available in the reactor.

The function was studied for the two types of plates with the following common operating conditions:

Liquid velocity coming into bed: 1 cm/s;
Temperature: 650K;
Pressure: 40 bar (1 bar=$10^5$ pascals);
2% by weight sulphur in feed;
Density of feed: 800 kg/m$^3$;
Heat capacity of feed: 1800 J/kg/K;
First order chemical reaction with respect to sulphur-containing compound of feed and with respect to hydrogen;
Reaction characteristics: K0 (pre-exponential term): 5.1× 10$^7$; Ea (activation energy)=120 kJ/mole; ΔH (enthalpy of reaction)=75 kJ/mole.

Results

With the prior art plate, the concentration of sulphur obtained at the outlet was equal to 10 ppm.

With the plate in accordance with the invention, a gain of 100 mm in the depth of the catalytic bed was obtained, i.e. a catalytic bed depth of 3100 mm.

The initial height of 3000 mm of catalytic bed was increased by 100 mm, gained by the positioning of the plate, which was placed higher up in the shell. This gain in height, and thus in catalytic volume, meant that desulphurization of the feed was more intense. The concentration of sulphur at the outlet dropped to 7.3 ppm.

Thus, positioning the distributor plate of the invention higher up means that the final degree of desulphurization is increased by more than 25% compared with the positioning in the prior art.

The invention claimed is:

1. A distributor plate (10) for distributing a polyphase mixture in a reactor terminating in a semi-spherical dome (2), the reactor having a wall, the distributor plate (10) to be located in an upper portion of the reactor above a bed of catalytic particles (30), said distributor plate comprising:
a plurality of chimneys (3) wherein each of said chimneys is provided with orifices (4) for passage of liquid distributed over the whole height (Hc) of each of said chimneys, and an orifice (5) for the passage of gas located at an upper end of each of said chimneys wherein the portion of the chimneys located at the periphery of the, referred to hereafter as peripheral chimneys, have their upper portion inclined by an angle alpha with respect to the vertical, said angle alpha having a value in the range 10° to 45° the inclination being approximately directed towards the center of the distributor plate, and, when positioned within the reactor, said peripheral chimneys are located at a distance (D1) in the range 25 to 450 mm from the wall of the reactor.

2. The distributor plate according to claim 1, in which said distance (D1) is in the range 25 to 250 mm.

3. The distributor plate according to claim 1, in which said angle alpha is in the range 10° to 30°.

4. The distributor plate according to claim 1, in which said peripheral chimneys (3) are inclined starting from a distance (d) with respect to the base of the distributor plate (10) which is in the range 10% to 80% of the total height of the chimneys.

5. The distributor plate according to claim 1, in which the peripheral chimneys and the portion of the chimneys positioned centrally on said distributor plate are separated by a pitch in the range 100 to 250 mm.

6. The distributor plate according to claim 1, in which the plurality of chimneys have a height (Hc) in the range 100 to 500 mm.

7. A process for the hydrotreatment or hydrogenation of oil cuts containing C4 to C20 carbon atoms, said process comprising performing the process in a reactor having a distributor plate in accordance with claim 1 located in an upper portion of the reactor above a bed of catalytic particles (30), and said process functioning in trickle bed mode, using a dispersed liquid phase having a surface velocity of less than 1.5 cm, and a gas phase which is the continuous phase.

8. The distributor plate according to claim 1, in which said peripheral chimneys (3) are inclined starting from a distance (d) with respect to the base of the distributor plate (10) which is in the range 50% to 80% of the total height of the chimneys.

9. The distributor plate according to claim 1, in which the peripheral chimneys and the portion of the chimneys positioned centrally on said distributor plate are separated by a pitch in the range 100 to 200 mm.

10. The distributor plate according to claim 1, in which the plurality of chimneys have a height (Hc) in the range 200 to 350 mm.

11. A reactor and distributor plate comprising:
a vertical reactor wall (1) and an upper semi-spherical dome (2),
a distributor plate positioned (10) in an upper portion of the reactor above a bed of catalytic particles (30),
said distributor plate having a plurality of chimneys (3) wherein each of said chimneys is provided with orifices (4) for passage of liquid distributed over the whole height (Hc) of each of said chimneys, and an orifice (5) for the passage of gas located at an upper end of each of said chimneys,
wherein the portion of the chimneys located at the periphery of the plate, referred to hereafter as peripheral chimneys, have their upper portion inclined by an angle alpha with respect to the vertical, said angle alpha having a value in the range 10° to 45°, the inclination being directed towards the center of the reactor, and, when positioned within the reactor, said peripheral chimneys are located at a distance (D1) in the range 25 to 450 mm from said wall of said reactor.

12. The reactor and distributor plate according to claim 11, in which said distance (D1) is in the range 25 to 250 mm.

13. The reactor and distributor plate according to claim 11, in which said angle alpha is in the range 10° to 30°.

14. The reactor and distributor plate according to claim 11, in which said peripheral chimneys (3) are inclined starting from a distance (d) with respect to the base of the distributor plate (10) which is in the range 10% to 80% of the total height of the chimneys.

15. The reactor and distributor plate according to claim 11, in which the peripheral chimneys and the portion of the chimneys positioned centrally on said distributor plate are separated by a pitch in the range 100 to 250 mm.

16. The reactor and distributor plate according to claim 11, in which the plurality of chimneys have a height (Hc) in the range 100 to 500 mm.

17. The reactor and distributor plate according to claim 11, in which said peripheral chimneys (3) are inclined starting from a distance (d) with respect to the base of the distributor plate (10) which is in the range 50% to 80% of the total height of the chimneys.

18. The reactor and distributor plate according to claim 11, in which the peripheral chimneys and the portion of the chimneys positioned centrally on said distributor plate are separated by a pitch in the range 100 to 200 mm.

19. The reactor and distributor plate according to claim 11, in which the plurality of chimneys have a height (Hc) in the range 200 to 350 mm.

* * * * *